(12) United States Patent
Hannuksela et al.

(10) Patent No.: US 11,800,131 B2
(45) Date of Patent: *Oct. 24, 2023

(54) APPARATUS, A METHOD AND A COMPUTER PROGRAM FOR VIDEO CODING AND DECODING

(71) Applicant: NOKIA TECHNOLOGIES OY, Espoo (FI)

(72) Inventors: Miska Matias Hannuksela, Tampere (FI); Kemal Ugur, Istanbul (TR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 17/504,092

(22) Filed: Oct. 18, 2021

(65) Prior Publication Data
US 2022/0038733 A1 Feb. 3, 2022

Related U.S. Application Data

(63) Continuation of application No. 16/689,582, filed on Nov. 20, 2019, now Pat. No. 11,153,592, which is a
(Continued)

(51) Int. Cl.
*H04N 19/463* (2014.01)
*H04N 19/70* (2014.01)
(Continued)

(52) U.S. Cl.
CPC ........... *H04N 19/463* (2014.11); *H04N 19/30* (2014.11); *H04N 19/61* (2014.11); *H04N 19/70* (2014.11)

(58) Field of Classification Search
CPC ...... H04N 19/463; H04N 19/30; H04N 19/61; H04N 19/70
See application file for complete search history.

(56) References Cited

U.S. PATENT DOCUMENTS 9,900,609 B2 2/2018 Hannuksela et al.
10,506,247 B2 12/2019 Hannuksela et al.
(Continued)

FOREIGN PATENT DOCUMENTS

CN 101420609 4/2009
KR 1020080027338 A 3/2008
(Continued)

OTHER PUBLICATIONS

"Parameter Values for the HDTV Standards for Production and International Programme Exchange", Recommendation ITU-R BT.709-5, BT Series Broadcasting service (television), Apr. 2002, 32 pages.
(Continued)

*Primary Examiner* — Maria E Vazquez Colon
(74) *Attorney, Agent, or Firm* — ALSTON & BIRD LLP

(57) ABSTRACT

A method comprising encoding a bitstream comprising a base layer, a first enhancement layer and a second enhancement layer; encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the base layer or the first enhancement layer to the second enhancement layer, wherein the second set of prediction types is a subset of all prediction types available for prediction between layers.

43 Claims, 7 Drawing Sheets

Related U.S. Application Data continuation of application No. 15/899,129, filed on Feb. 19, 2018, now Pat. No. 10,506,247, which is a continuation of application No. 14/143,986, filed on Dec. 30, 2013, now Pat. No. 9,900,609.

(60) Provisional application No. 61/748,938, filed on Jan. 4, 2013.

(51) Int. Cl.
  *H04N 19/30* (2014.01)
  *H04N 19/61* (2014.01)

(56) References Cited

U.S. PATENT DOCUMENTS

| | | | |
|---|---|---|---|
| 2007/0014346 A1* | 1/2007 | Wang | H04N 19/132 375/E7.199 |
| 2007/0086521 A1* | 4/2007 | Wang | H04N 19/44 375/E7.199 |
| 2008/0089411 A1* | 4/2008 | Wenger | H04N 19/105 375/E7.243 |
| 2009/0003389 A1 | 1/2009 | Joung et al. | |
| 2010/0202540 A1 | 8/2010 | Fang | |
| 2012/0044322 A1 | 2/2012 | Tian et al. | |
| 2012/0056981 A1 | 3/2012 | Tian et al. | |
| 2012/0230431 A1 | 9/2012 | Boyce et al. | |
| 2012/0243606 A1 | 9/2012 | Lainema et al. | |
| 2013/0279576 A1* | 10/2013 | Chen | H04N 19/70 375/240.12 |
| 2013/0287093 A1 | 10/2013 | Hannuksela et al. | |

FOREIGN PATENT DOCUMENTS

| | | |
|---|---|---|
| KR | 1020120024578 A | 3/2012 |
| WO | WO 2012/0167712 | 12/2012 |
| WO | WO 2012/1167711 A1 | 12/2012 |
| WO | WO 2013/1160559 A1 | 10/2013 |

OTHER PUBLICATIONS

"Parameter Values for Ultra-High Definition Television Systems for Production and International Programme Exchange", Recommendation ITU-R BT.220, BT Series, Broadcasting service (television), Aug. 2012, 7 pages.
Boyce et al., "High Level Syntax Hooks for Future Extensions", Joint Collaborative Team on Video Coding (JCT-VC) ITU-T SG16 WP3 and ISO/IEC JTC1/SC29NVG11, 8th Meeting, Feb. 1-10, 2012, pp. 1-6.
Boyce et al., "NAL Unit Header and Parameter Set Designs for HEVC Extensions", Joint Collaborative Team on Video Coding (JCT-VC) of ITU-T SG16 WP3 and ISO/IEC JTC1/SC29NVG11, 11th Meeting, Oct. 10-19, 2012, pp. 1-8.
Choi, B et al. "MV-HEVC/SHVC HLS: On interlayer prediction type." Samsung Electronics Co., Ltd., Joint Collaborative Team on Video Coding (JCT-VC) of ITU-T SG16 WP3 and ISO/IEC JTC1/SC29/WG11; 5th Meeting: Vienna, AT, Jul. 25-Aug. 2, 2013; 14th Meeting: Vienna, AT, Jul. 27-Aug. 2, 2013, 4 pages.
H. Schwarz, et al.; "Overview of the Scalable Video coding extension of the H.264/AVC Standard"; IEEE Transactions on Circuits and Systems for Video Technology; vol. 17, No. 9; Sep. 2007; pp. 1103-1120.
Yamamoto, T. et al. "Non-Square Partition Mode Grouping for CAVLC." SHARP Corporation, Joint Collaborative Team on Video Coding (JCT-VC) of ITU-T SG16 WP3 and ISO/IEC JTC1/SC29/WG11; 7th Meeting: Geneva, CH, Nov. 21-30, 2011, 3 pages.
International Search Report and Written Opinion received for corresponding Patent Cooperation Treaty Application No. PCT/FI2013/051216, dated Apr. 9, 2014, 13 pages.
U.S. Appl. No. 61/449,079, "Depth Map Coding", filed Mar. 3, 2011, 63 pages.
U.S. Appl. No. 61/706,727, "Method and Technical Equipment for Scalable Video Coding", filed Sep. 27, 2012, 63 pages.
Office Action for U.S. Appl. No. 16/689,582 dated Jun. 19, 2020.
Final Office Action for U.S. Appl. No. 16/689,582 dated Jan. 14, 2021, 18 pages.
Notice of Allowance for U.S. Appl. No. 16/689,582 dated Jun. 14, 2021.
Office Action for U.S. Appl. No. 14/143,986 dated Jan. 29, 2016, 13 pages.
Office Action for U.S. Appl. No. 14/143,986 dated Oct. 6, 2016, 13 pages.
Advisory Action for U.S. Appl. No. 14/143,986 dated Feb. 13, 2017.
Notice of Allowance for U.S. Appl. No. 14/143,986 dated Oct. 5, 2017.
Extended European Search Report for corresponding European Patent Application No. 13870207.1 dated Jun. 15, 2016; 8 pages.
Office Action from corresponding European Application No. 13 870207.1 dated Sep. 4, 2017, 5 pages.
Summons to Attend Oral Proceedings for European Application No. 13870207.1 dated Apr. 25, 2019, 7 pages.
Result of Consultation for European Application No. 13 870 207.1 dated Nov. 13, 2019, 2 pages.
Minutes of the Oral Proceedings for European Application No. 13 870 207.1 dated Dec. 10, 2019, 19 pages.
Intention to Grant for European Application No. 13 870 207.1 dated Dec. 17, 2019, 10 pages.
Office Action for U.S. Appl. No. 15/899,129 dated Jul. 27, 2018.
Notice of Allowance for U.S. Appl. No. 15/899,129 dated Apr. 9, 2019.
Notice of Allowance for U.S. Appl. No. 15/899,129 dated Jul. 29, 2019.
Office Action from corresponding Chinese Application No. 201380074258.X dated Oct. 20, 2017, with English Translation, 13 pages.
Office Action for Chinese Application No. 201380074258X dated Jan. 2, 2019, 8 pages.
Office Action for Chinese Application No. 201380074258X dated May 8, 2019, 6 pages.
Decision to Grant for Chinese Application No. 201380074258X dated Sep. 19, 2019, 3 pages.
Office Action from corresponding Korean Patent Application No. 2015-7020987 dated Nov. 28, 2016.
Office Action from corresponding Korean Patent Application No. 2015-7020987 dated Nov. 28, 2017 with English Summary, 6 pages.
Notice of Allowance for Korean Application No. 10-2015-7020987 dated Mar. 30, 2018, 3 pages.
Search Report and Written Opinion for corresponding Singapore Application No. 11201505278T, dated Jul. 12, 2016, 10 pages.
U.S. Appl. No. 16/689,582, filed Nov. 20, 2019, U.S. Pat. No. 11,153,592, Patented.
U.S. Appl. No. 15/899,129, filed Feb. 19, 2018, U.S. Pat. No. 10,506,247, Patented.
U.S. Appl. No. 14/143,986, filed Dec. 30, 2013, U.S. Pat. No. 9,900,609, Patented.

* cited by examiner

APPARATUS, A METHOD AND A COMPUTER PROGRAM FOR VIDEO CODING AND DECODING

CROSS-REFERENCE TO RELATED APPLICATIONS

This application is a continuation of U.S. application Ser. No. 16/689,582, filed Nov. 20, 2019, which is a continuation of U.S. application Ser. No. 15/899,129, filed Feb. 19, 2018, which is a continuation of U.S. application Ser. No. 14/143,986, filed Dec. 30, 2013, which claims priority to U.S. Provisional Application No. 61/748,938, filed Jan. 4, 2013, the entire contents of which are incorporated herein by reference.

TECHNICAL FIELD

The present invention relates to an apparatus, a method and a computer program for video coding and decoding.

BACKGROUND

A video codec may comprise an encoder which transforms input video into a compressed representation suitable for storage and/or transmission and a decoder that can uncompress the compressed video representation back into a viewable form, or either one of them. Typically, the encoder discards some information in the original video sequence in order to represent the video in a more compact form, for example at a lower bit rate.

Scalable video coding refers to coding structure where one bitstream can contain multiple representations of the content at different bitrates, resolutions or frame rates. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers.

Many hybrid codecs encode video information in two phases, predictive coding for obtaining a predicted block of pixels, and then coding an error between the predicted block of pixels and the original block of pixels. The predictive coding may be accomplished in various ways, including various types of sample prediction (e.g. motion compensation mechanisms, inter-view, inter-layer, intra and view synthesis predictions) and syntax prediction (e.g. motion vector prediction, block partitioning, filter parameter prediction). Moreover, the prediction dependencies may be applied across different domains (e.g. texture and depth) and scalability types.

Thus, it is possible that an encoding and/or a decoding scheme may enable the use of multiple types of scalability and/or multiple references for the same type of prediction. However, it has turned out that from the compression efficiency viewpoint, it may be inefficient to have all all prediction types available for prediction between the layers.

SUMMARY

This invention proceeds from the consideration that in order to improve compression efficiency in cases where multiple types of scalability and/or multiple references for the same type of prediction are enabled by the (de)coding scheme, the type of prediction applied in a multi-reference scalable (de)coding scheme is enabled to be adaptively selected and/or signaled.

A method according to a first embodiment comprises a method for encoding a bitstream comprising a base layer, a first enhancement layer and a second enhancement layer, the method further comprising encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to an embodiment, instead or in addition to the indication of the first or the second set of prediction types that is applicable from the base or the first enhancement layer to the second enhancement layer, encoding, in the bitstream, an indication of at least one set of prediction types that is not applicable from the base or the first enhancement 1 layer to the second enhancement layer.

According to an embodiment, the second enhancement layer enhances of a first scalability type relative to the base layer and a second scalability type relative to the first enhancement layer.

According to an embodiment, the method further comprises associating an indication for each of one or more combinations of the base and/or the first enhancement layer and the second enhancement layer; and encoding one or more of said indications in the bitstream to indicate whether a particular set of prediction types is applicable for prediction from the base and/or the first enhancement layer to the second enhancement layer or whether that particular set of prediction types is not applicable for prediction from the base and/or the first enhancement layer to the second enhancement layer.

According to an embodiment, the method further comprises encoding said indication in at least one of the following syntax structures: a video parameter set, a sequence parameter set, a picture parameter set, any other type of a parameter set, a sequence header, a group of pictures header, a picture header, a slice header, and/or a supplemental enhancement information message.

According to an embodiment, said prediction types include at least one of the following: sample prediction, motion information prediction, filtering parameter prediction.

According to an embodiment, the method further comprises associating an indication to indicate the applicability of several types of prediction into one value of a syntax element.

According to an embodiment, the method further comprises: encoding, in the syntax structure, an indication for a certain prediction type; and encoding, in the syntax structure, a list of pairs of reference and enhancement layers between which the prediction type is applicable.

According to an embodiment, encoding one or more indications for a first type of pictures, such as for RAP pictures, and encoding one or more indications for a second type of pictures, such as for non-RAP pictures.

According to an embodiment, encoding indications separately for different types of scalability, different sets of scalability layers, and/or different sets of temporal sublayers.

An apparatus according to a second embodiment comprises: a video encoder configured for encoding a bitstream comprising a base layer, a first enhancement layer and a second enhancement layer, wherein said video encoder is further configured for encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a third embodiment there is provided a computer readable storage medium stored with code thereon for use by an apparatus, which when executed by a processor, causes the apparatus to perform: encoding an indication of both a base layer and a first enhancement layer used for prediction a the second enhancement layer in a bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a fourth embodiment there is provided at least one processor and at least one memory, said at least one memory stored with code thereon, which when executed by said at least one processor, causes an apparatus to perform: encoding an indication of both a base layer and a first enhancement layer used for prediction for a second enhancement layer in a bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

A method according to a fifth embodiment comprises a method for decoding a bitstream comprising a base layer, a first enhancement layer and a second enhancement layer, the method comprising interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to an embodiment, instead or in addition to the indication of the first or the second set of prediction types that is applicable from the base or the first enhancement layer to the second enhancement layer, the method further comprises decoding, from the bitstream, an indication of at least one set of prediction types that is not applicable from the base or the first enhancement layer to the second enhancement layer.

According to an embodiment, the second enhancement layer enhances of a first scalability type relative to the base layer and a second scalability type relative to the first enhancement layer.

According to an embodiment, the bitstream comprises an indication associated for each of one or more combinations of the base and/or the first enhancement layer and the second enhancement layer; and the method further comprises decoding one or more of said indications from the bitstream to interpret whether a particular set of prediction types is applicable for prediction from the base and/or the first enhancement layer to the second enhancement layer or whether that particular prediction type is not applicable for prediction from the base and/or the first enhancement layer to the second enhancement layer.

According to an embodiment, the method further comprises decoding said indication from at least one of the following syntax structures: a video parameter set, a sequence parameter set, a picture parameter set, any other type of a parameter set, a sequence header, a group of pictures header, a picture header, a slice header, and/or a supplemental enhancement information message.

According to an embodiment, said prediction types include at least one of the following: sample prediction, motion information prediction, filtering parameter prediction.

According to an embodiment, the method further comprises interpreting an indication indicating the applicability of several types of prediction into one value of a syntax element.

According to an embodiment, the method further comprises: decoding, from the syntax structure, an indication for a certain prediction type; and decoding, from the syntax structure, a list of pairs of reference and enhancement layers between which the prediction type is applicable.

According to an embodiment, decoding one or more indications for a first type of pictures, such as for RAP pictures, and decoding one or more indications for a second type of pictures, such as for non-RAP pictures.

According to an embodiment, decoding indications separately for different types of scalability, different sets of scalability layers, and/or different sets of temporal sublayers.

An apparatus according to a sixth embodiment comprises: a video decoder configured for decoding a bitstream comprising a base layer, a first enhancement layer and a second enhancement layer, the video decoder being configured for interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to a seventh embodiment there is provided a computer readable storage medium stored with code thereon for use by an apparatus, which when executed by a processor, causes the apparatus to perform: interpreting, from a bitstream, an indication indicating both a base layer and a first enhancement layer used for prediction for a second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to an eighth embodiment there is provided at least one processor and at least one memory, said at least one memory stored with code thereon, which when executed by said at least one processor, causes an apparatus to perform: interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to a ninth embodiment there is provided a video encoder configured for encoding a bitstream comprising a base layer, a first enhancement layer and a second one enhancement layer, wherein said video encoder is further configured for: encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a tenth embodiment there is provided a video decoder configured for decoding a bitstream comprising a base layer, a first enhancement layer and a second enhancement layer, wherein said video decoder is further configured for: interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
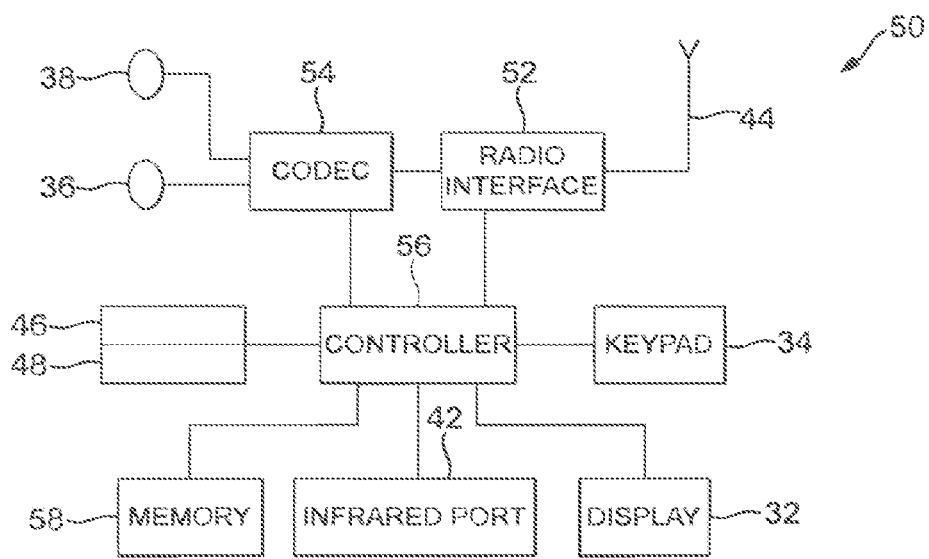
FIG. 1 shows schematically an electronic device employing some embodiments of the invention.
Figure 2:
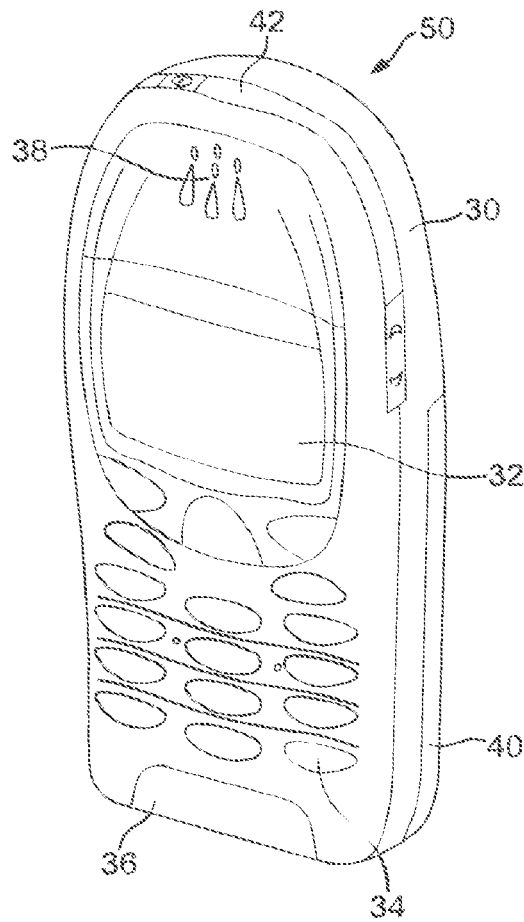
FIG. 2 shows schematically a user equipment suitable for employing some embodiments of the invention.

The following describes in further detail suitable apparatus and possible mechanisms for encoding an enhancement layer sub-picture without significantly sacrificing the coding efficiency. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
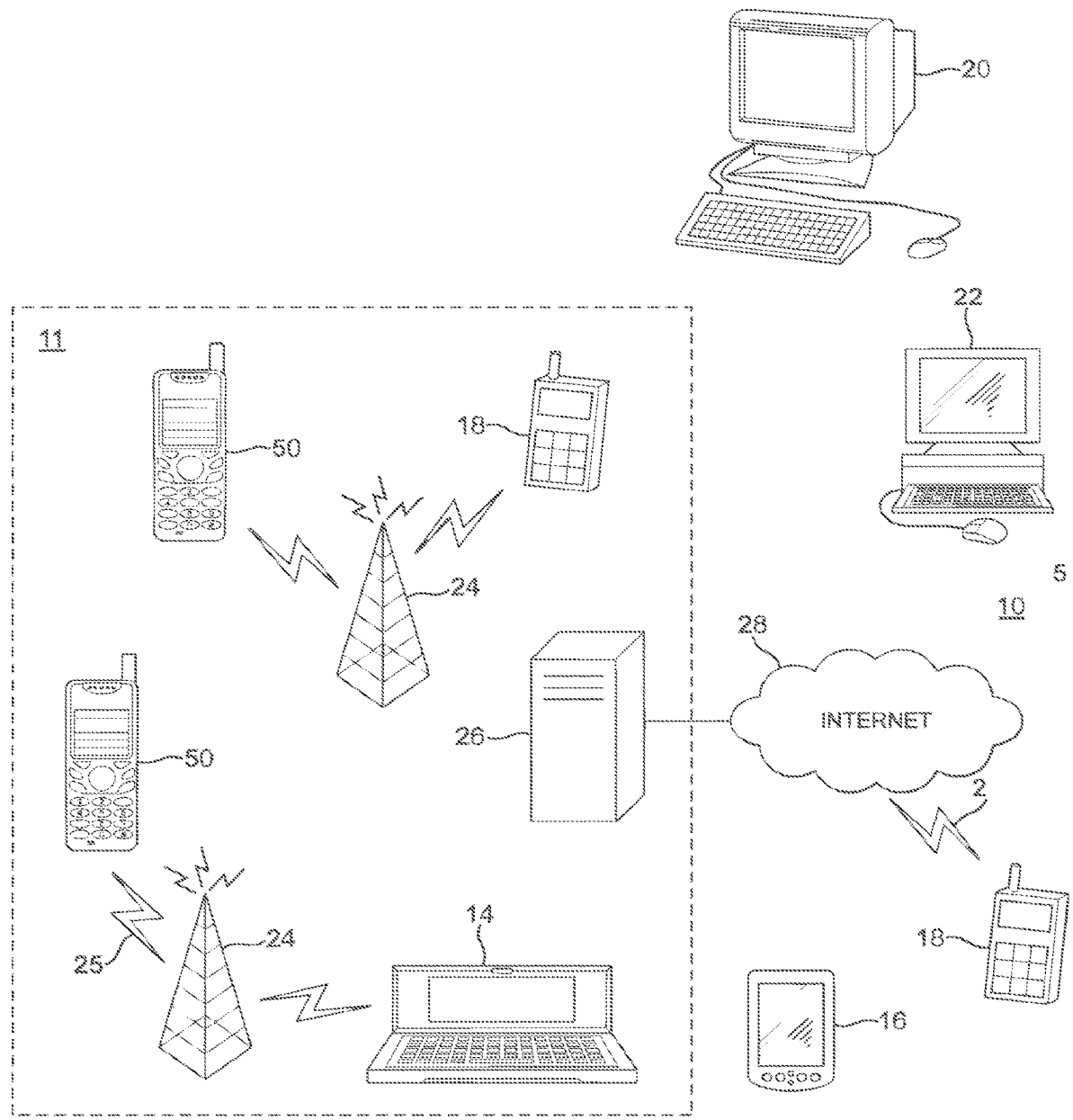
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec may comprise an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Video coding is typically a two-stage process: First, a prediction of the video signal is generated based on previous coded data. Second, the residual between the predicted signal and the source signal is coded. Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
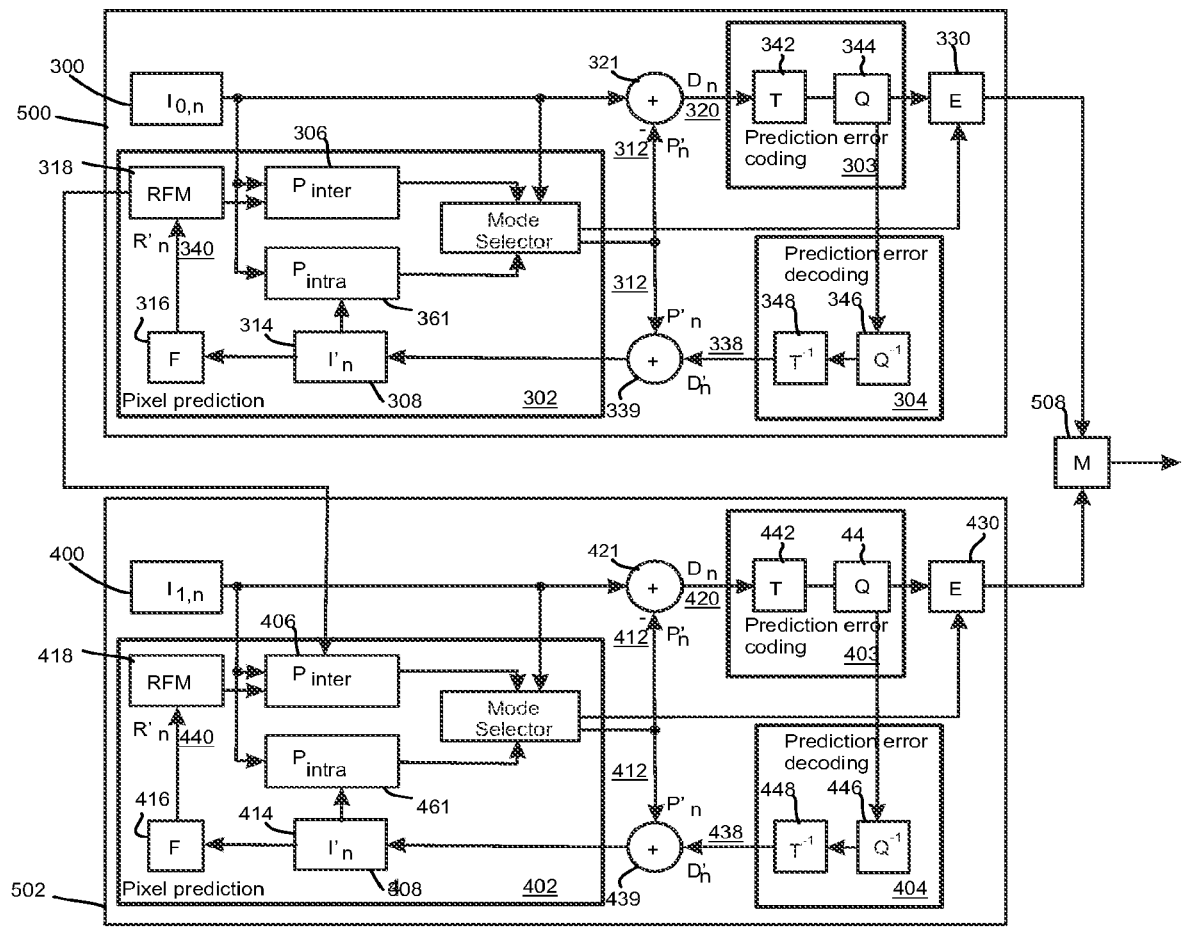
FIG. 4 shows schematically an encoder suitable for implementing some embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer pictures 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer pictures 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC). There is a currently ongoing standardization project of High Efficiency Video Coding (HEVC) by the Joint Collaborative Team—Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode for intra prediction, i.e. the prediction direction to be applied in a particular prediction mode, may be vertical, horizontal, diagonal. For example, in the current HEVC draft codec, unified intra prediction provides up to 34 directional prediction modes, depending on the size of PUs, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
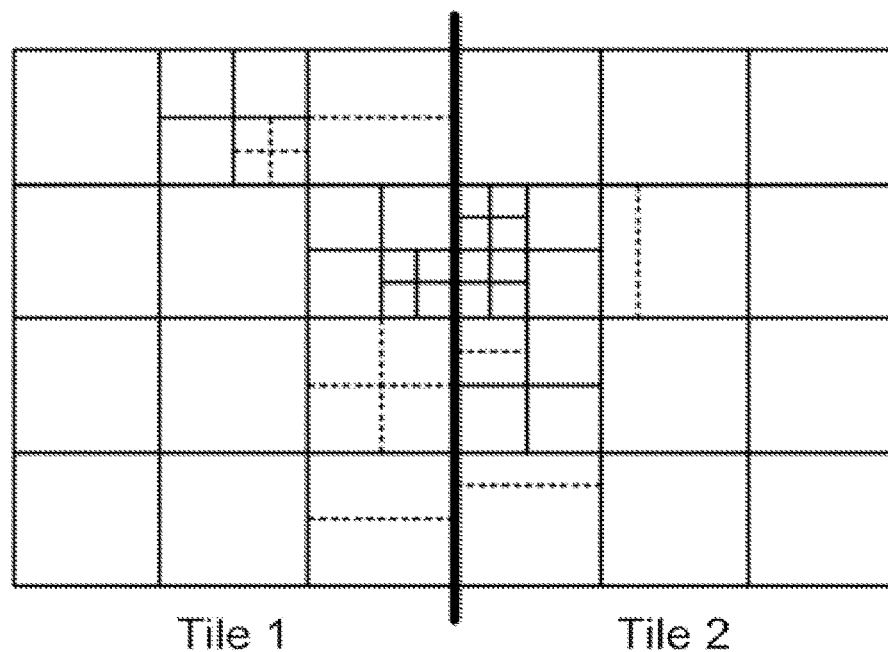
FIG. 5 shows an example of a picture consisting of two tiles.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In a draft HEVC standard, a slice segment is defined to be an integer number of coding tree units ordered consecutively in the tile scan and contained in a single NAL unit. The division of each picture into slice segments is a partitioning. In a draft HEVC standard, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In a draft HEVC standard, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor
3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

Coded slices can be categorized into three classes: raster-scan-order slices, rectangular slices, and flexible slices.

A raster-scan-order-slice is a coded segment that consists of consecutive macroblocks or alike in raster scan order. For example, video packets of MPEG-4 Part 2 and groups of macroblocks (GOBs) starting with a non-empty GOB header in H.263 are examples of raster-scan-order slices.

A rectangular slice is a coded segment that consists of a rectangular area of macroblocks or alike. A rectangular slice may be higher than one macroblock or alike row and narrower than the entire picture width. H.263 includes an optional rectangular slice submode, and H.261 GOBs can also be considered as rectangular slices.

A flexible slice can contain any pre-defined macroblock (or alike) locations. The H.264/AVC codec allows grouping of macroblocks to more than one slice groups. A slice group can contain any macroblock locations, including non-adjacent macroblock locations. A slice in some profiles of H.264/AVC consists of at least one macroblock within a particular slice group in raster scan order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. A draft HEVC standard includes a 1-bit nal_ref_idc syntax element, also known as nal_ref_flag, which when equal to 0 indicates that a coded slice contained in the NAL unit is a part of a non-reference picture and when equal to 1 indicates that a coded slice contained in the NAL unit is a part of a reference picture. The header for SVC and MVC NAL units may additionally contain various indications related to the scalability and multiview hierarchy.

In a draft HEVC standard, a two-byte NAL unit header is used for all specified NAL unit types. The NAL unit header contains one reserved bit a six-bit NAL unit type indication, a three-bit nuh_temporal_id plus1 indication for temporal level (may be required to be greater than or equal to 1) and a six-bit reserved field (called reserved_zero_6bits). The temporal_id syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes.

The six-bit reserved field is expected to be used by extensions such as a future scalable and 3D video extension. It is expected that these six bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_zero_6bits for example as follows: LayerId=reserved_zero_6bits.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

TABLE 1

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, | RASL_N, | Coded slice segment of a RASL |

TABLE 1-continued

| nal_unit_type | Name of nal_unit_type | Content of NAL unit and RBSP syntax structure |
|---|---|---|
| 9 | RASL_R, | picture slice_layer_rbsp( ) |
| 10, 12 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP BLA_N_LP | Coded slice segment of a BLA picture slice_segment_layer_rbsp( ) [Ed. (YK): BLA_W_DLP -> BLA_W_RADL?] |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 . . . RSV_RAP_VCL23 | Reserved // reserved RAP VCL NAL unit types |
| 24 . . . 31 | RSV_VCL24 . . . RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In a draft HEVC standard a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC, there is also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1. In some later drafts of HEVC, the APS syntax structure was removed from the specification text.

A draft HEVC standard also includes a fourth type of a parameter set, called a video parameter set (VPS), which was proposed for example in document JCTVC-H0388 (http://phenix.int-evry.fr/jct/doc_end_user/documents/8_San%20Jose/wg11/JCTVC-H0388-v4.zip). A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sublayers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a draft HEVC standard, a slice header additionally contains an APS identifier, although in some later drafts of the HEVC standard the APS identifier was removed from the slice header. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In a draft HEVC standard, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, can be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may be considered to start from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices. In some later drafts of the HEVC standard, the combined list was removed.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the 64$^{th}$ MPEG meeting, Mar. 10 to 14, 2003, Pattaya, Thailand.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. For SVC enhancement layers, there is an additional macroblock coding mode, which may be referred to as IntraBL when the co-located reference layer blocks are intra-coded, in which the prediction is inferred from the co-located blocks in the reference layer. In IntraBL, the prediction signal is constructed by the potentially up-sampled (for spatial scalable coding) reconstructed decoded reference layer blocks. Furthermore, in inter-layer residual prediction, residual data from lower layers can be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in the SVC draft may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where base layer pictures provide higher fidelity and/or higher spatial resolution in chroma (e.g. coded in 4:4:4 chroma format) than enhancement layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

In multiview video coding, more than one view may be coded, represented in a coded bitstream, and decoded from a bitstream. A view may for example correspond to a camera in a multiview camera setup.

H.264/AVC includes a multiview coding extension, MVC. In MVC, both inter prediction and inter-view prediction use similar motion-compensated prediction process. Inter-view reference pictures (as well as inter-view only reference pictures, which are not used for temporal motion-compensated prediction) are included in the reference picture lists and processed similarly to the conventional ("intra-view") reference pictures with some limitations. There is an ongoing standardization activity to specify a multiview extension to HEVC, referred to as MV-HEVC, which would be similar in functionality to MVC.

There are ongoing standardization activities for depth-enhanced video coding where both texture views and depth views are coded.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A ranging information for a particular view represents distance information of a texture sample from the camera sensor, disparity or parallax information between a texture sample and a respective texture sample in another view, or similar information. Ranging information of real-word 3D scene depends on the content and may vary for example from 0 to infinity. Different types of representation of such ranging information can be utilized. A depth view refers to a view that represents ranging information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

In a scheme referred to as unpaired multiview video-plus-depth (MVD), there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Depth-enhanced video formats enable generation of virtual views or pictures at camera positions that are not represented by any of the coded views. Generally, any depth-image-based rendering (DIBR) algorithm may be used for synthesizing views.

In the following some example coding and decoding methods which exploit inter-component redundancy and which may be used in or with various embodiments of the invention are described. It needs to be understood that these coding and decoding methods are given as examples and embodiments of the invention may be applied with other similar coding methods and/or other coding methods utilizing inter-component redundancies or dependencies.

In a coding tool known as joint multiview video plus depth coding (JMVDC), the correlation between the multi-view texture video and the associated depth view sequences is exploited. Although the pixel values are quite different between a texture video and its depth map sequence, the silhouettes and movements of the objects in the texture video and the associated depth map sequence are typically similar. The JMVDC scheme may be realized by a combination of the MVC and SVC coding schemes or any other similar coding schemes including inter-view prediction similar to MVC and inter-layer motion prediction similar to SVC. Specifically, JMVDC may be realized by embedding the inter-layer motion prediction mechanism of SVC into the prediction structure in MVC. Each view may be coded and/or regarded as of a two-layer representation, where the texture resides in the base layer and the depth in the enhancement layer, which may be coded using the coarse granular scalability (CGS) of SVC with only inter-layer motion prediction allowed. In addition, inter-view prediction is enabled both in the base layer (texture) and in the enhancement layer (depth) for non-base views. While the inter-layer motion prediction of JMVDC could be applied for any inter-view prediction structure used for the base layer, an encoder and decoder may be realized in such a manner that inter-view prediction only appears at IDR and anchor access units, as it may provide a reasonable compromise between complexity and compression efficiency and ease the implementation effort of JMVDC. In the following, the JMVDC scheme is described for the IDR/anchor and non-anchor access units when inter-view prediction is allowed only in IDR/anchor access units and disallowed in non-IDR/non-anchor access units.

For IDR and anchor pictures, the JMVDC scheme may be applied as follows. A motion vector used in the inter-view prediction is called a disparity vector. The disparity vectors of the multiview texture video are used as a prediction reference for derivation of the disparity vectors of multiview depth map in the inter-layer motion prediction process. In an example coding scheme, this prediction mechanism is referred as the inter-layer disparity prediction. For the coding of non-IDR/non-anchor pictures in JMVDC, the depth motion vectors for inter prediction may be predicted using the inter-layer motion prediction process from the respective texture motion vectors.

The mode decision process for enhancement layer macroblocks may be identical for both anchor pictures and non-anchor pictures. The base mode may be added to the mode decision process and the motion/disparity vector of the co-located macroblock in the base layer may be chosen as a motion/disparity vector predictor for each enhancement layer macroblock.

The JMVDC tool may also be used in an arrangement where a depth view is regarded as the base layer and the respective texture view as the enhancement layer, and coding and decoding may be done otherwise as described above.

A coding tool known as inside-view motion prediction (IVMP) may operate as follows. In IVMP mode, the motion information, for example including mode information (e.g. mb_type and sub_mb_type), reference indices and motion vectors of the co-located block (e.g. a co-located macroblock) in a texture view component may be reused by the depth view component of the same view. It may be signaled whether a block uses the IVMP mode. For example, a flag may be signaled in each macroblock or macroblock partition to indicate whether it uses the IVMP mode. If the spatial resolution of the depth view component differs from that of the texture view component, the motion vectors of the depth view components may be scaled proportionally to the ratio between the spatial resolutions of the texture view component and the depth view component, when they are used as the motion vectors of the co-located block or macroblock of the texture view component.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use similar motion-compensated prediction process. For example, inter-view reference pictures and inter-view only reference pictures are essentially treated as long-term reference pictures in the different prediction processes. Similarly, view synthesis prediction may be realized in such a manner that it uses essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

As reference picture lists in scalable, multiview, and depth-enhanced video coding and any combination of them may contain more than one type of reference pictures, e.g. inter reference pictures, inter-view reference pictures, and VSP reference pictures, a term prediction direction may be defined e.g. to indicate the use of intra-view reference pictures (temporal prediction), inter-view prediction, or VSP. For example, an encoder may choose for a specific block a reference index that points to an inter-view reference picture, thus the prediction direction of the block is inter-view. In some cases inter-view and VSP may be considered to be of the same prediction direction as both use information from other view(s) as reference.

A VSP reference picture may also be referred to as synthetic reference component, which may be defined to contain samples that may be used for view synthesis prediction. A synthetic reference component may be used as reference picture for view synthesis prediction but is typically not output or displayed. A view synthesis picture may be generated for the same camera location assuming the same camera parameters as for the picture being coded or decoded.

A view-synthesized picture may be introduced in the reference picture list in a similar way as is done with inter-view reference pictures. Signaling and operations with reference picture list in the case of view synthesis prediction may remain identical or similar to those specified in H.264/AVC or HEVC.

A synthesized picture resulting from VSP may be included in the initial reference picture lists List0 and List1 for example following temporal and inter-view reference frames. However, reference picture list modification syntax (i.e., RPLR commands) may be extended to support VSP reference pictures, thus the encoder can order reference picture lists at any order, indicate the final order with RPLR commands in the bitstream, causing the decoder to reconstruct the reference picture lists having the same final order.

Processes for predicting from view synthesis reference picture, such as motion information derivation, may remain identical or similar to processes specified for inter, inter-layer, and inter-view prediction of H.264/AVC or HEVC. Alternatively or in addition, specific coding modes for the view synthesis prediction may be specified and signaled by the encoder in the bitstream. In other words, VSP may alternatively or also be used in some encoding and decoding arrangements as a separate mode from intra, inter, inter-view and other coding modes. For example, in a VSP skip/direct mode the motion vector difference (de)coding and the (de)coding of the residual prediction error for example using transform-based coding may also be omitted. For example, if a macroblock may be indicated within the bitstream to be coded using a skip/direct mode, it may further be indicated within the bitstream whether a VSP frame is used as reference. Alternatively or in addition, view-synthesized reference blocks, rather than or in addition to complete view synthesis reference pictures, may be generated by the encoder and/or the decoder and used as prediction reference for various prediction processes.

To enable view synthesis prediction for the coding of the current texture view component, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

The forward view synthesis process may comprise two conceptual steps: forward warping and hole filling. In forward warping, each pixel of the reference image is mapped to a synthesized image. When multiple pixels from reference frame are mapped to the same sample location in the synthesized view, the pixel associated with a larger depth value (closer to the camera) may be selected in the mapping competition. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels may be filled by one of the two adjacent non-hole pixels which have a smaller depth sample value (farther from the camera).

In a scheme referred to as a backward view synthesis or backward-projected view synthesis, the depth map co-located with the synthesized view is used in the view synthesis process. View synthesis prediction using such backward view synthesis may be referred to as backward view synthesis prediction or backward-projected view synthesis prediction or B-VSP. To enable backward view synthesis prediction for the coding of the current texture view component, the depth view component of the currently coded/decoded texture view component is required to be available. In other words, when the coding/decoding order of a depth view component precedes the coding/decoding order of the respective texture view component, backward view synthesis prediction may be used in the coding/decoding of the texture view component.

With the B-VSP, texture pixels of a dependent view can be predicted not from a synthesized VSP-frame, but directly from the texture pixels of the base or reference view. Displacement vectors required for this process may be produced from the depth map data of the dependent view, i.e. the depth view component corresponding to the texture view component currently being coded/decoded.

Figure 6:
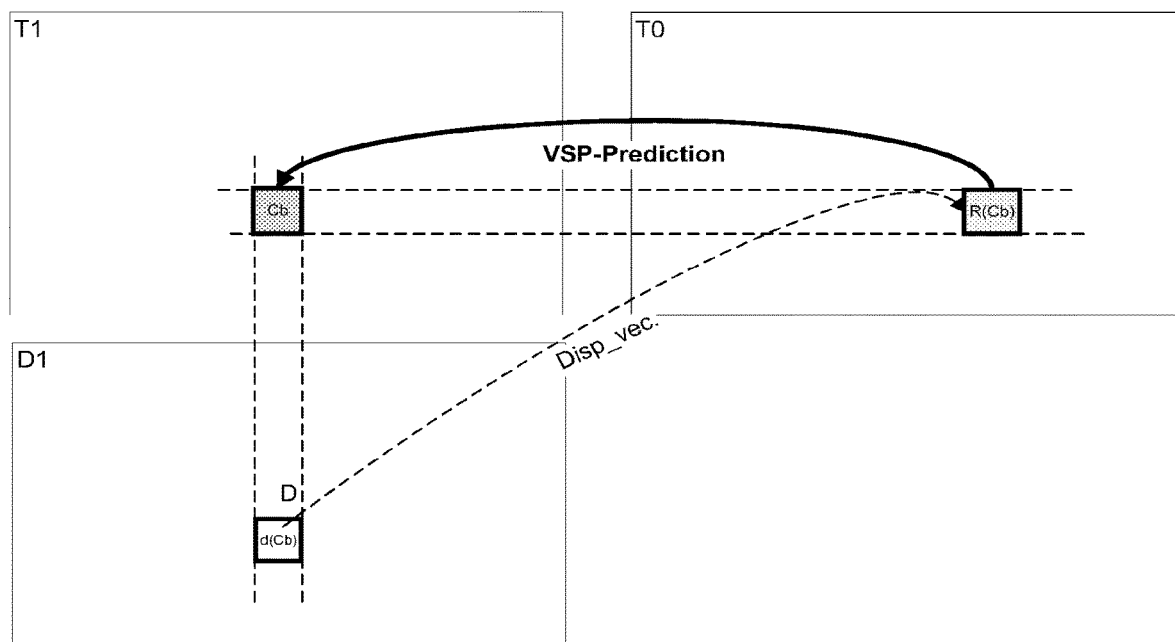
FIG. 6 illustrates the concept of backward view synthesis prediction (B-VSP)

The concept of B-VSP may be explained with reference to FIG. 6 as follows. Let us assume that the following coding order is utilized: (T0, D0, D1, T1). Texture component T0 is a base view and T1 is dependent view coded/decoded using B-VSP as one prediction tool. Depth map components D0 and D1 are respective depth maps associated with T0 and T1, respectively. In dependent view T1, sample values of currently coded block Cb may be predicted from reference area R(Cb) that consists of sample values of the base view T0. The displacement vector (motion vector) between coded and reference samples may be found as a disparity between T1 and T0 from a depth map value associated with a currently coded texture sample.

As described above, many hybrid video codecs, including H.264/AVC and HEVC, encode video information in two phases. In the first phase, predictive coding is applied for example as so-called sample prediction or as so-called syntax prediction. In the sample prediction, pixel or sample values in a certain picture area or "block" are predicted. These pixel or sample values can be predicted, for example, using one or more of the following ways:

Motion compensation mechanisms (which may also be referred to as temporal prediction or motion-compensated temporal prediction), which involve finding and indicating an area in one of the previously encoded video frames that corresponds closely to the block being coded.

Inter-view prediction, which involves finding and indicating an area in one of the previously encoded view components that corresponds closely to the block being coded.

View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

The block partitioning, e.g. from CTU to CUs and down to PUs, may be predicted.

In filter parameter prediction, the filtering parameters e.g. for sample adaptive offset may be predicted.

Another, complementary way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Figure 7:
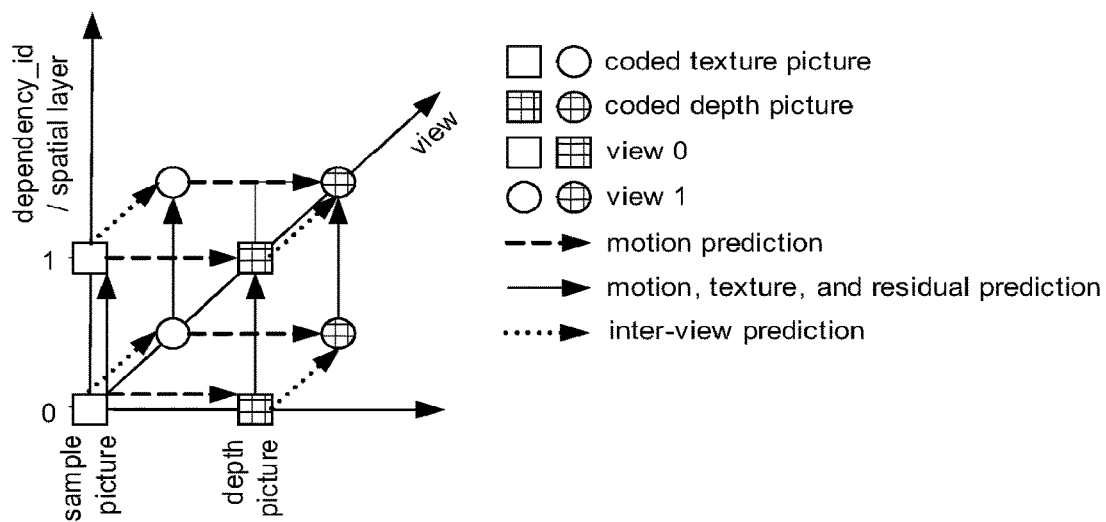
FIG. 7 shows an example of an access unit including both coded texture and depth, representing two views and having two dependency representations per one view component.

FIG. 7 shows an example of an access unit (i.e., coded data of one time instance) in the case of two dependency representations per one view component (both depth and texture/sample). It is noted that the number of coded views may be one or more and the number of layers or dependency representations for the sample or texture picture may be one or more. In the example of FIG. 7, the number of views is two and the number of layers for the sample picture is two just for illustrative purposes. The squares illustrate view 0 and circles illustrate view 1. The squares and circles at the bottom of the FIG. 7 represent the base layer and the squares and circles above the squares and circles of the base layer represent the first enhancement layer.

In FIG. 7, the enhancement texture/sample dependency representation uses spatial scalability and can use inter-layer prediction, such as motion, texture (Intra BL), and/or residual prediction, from the base texture/sample dependency representation. The depth view components on the base and enhancement layer may use inter-component prediction, such as inside view motion prediction or similar, from the respective texture/sample view components. View components on view 1 may use inter-view prediction from the respective view component on view 0.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

The second phase in many video encoding schemes is coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks using the prediction information created by the encoder and stored in the compressed representation of the image and prediction error decoding, which is an inverse operation of the prediction error coding to recover the quantized prediction error signal in the spatial domain. After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence. Filtering may be used to reduce various artifacts such as blocking, ringing etc. from the reference images. After motion compensation followed by adding inverse transformed residual, a reconstructed picture is obtained. This picture may have various artifacts such as blocking, ringing etc. In order to eliminate the artifacts, various post-processing operations may be applied. If the post-processed pictures are used as reference in the motion compensation loop, then the post-processing operations/filters are usually called loop filters. By employing loop filters, the quality of the reference pictures increases. As a result, better coding efficiency can be achieved.

Referring back to the example of FIG. 7, it can be observed that the types of prediction between component pictures are pre-determined. Moreover, the reference for prediction is selected along pre-determined scalability identifiers. For example, inter-layer prediction is applied from a component picture having a lower value of dependency_id (compared to the dependency_id of the component picture being coded/decoded). For example, the top-right component picture in FIG. 7, i.e. the spatial enhancement of the depth picture on view 1, could have motion prediction either from the respective texture/sample picture, i.e. the spatial enhancement of the texture picture on view 1, or the base layer depth picture, i.e. the base layer depth picture on view 1.

It can be assumed that when multiple types of scalability and/or multiple references for the same type of prediction were enabled by the (de)coding scheme, compression improvement could be achieved when the prediction reference could be adaptively selected. Therefore, there is a need for mechanisms for adaptively selecting and/or signaling the type of prediction applied in a multi-reference scalable (de)coding scheme.

In the following, term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

In some embodiments, an enhancement layer may have more than one reference layers, e.g. a first reference layer and a second reference layer, and an enhancement layer may have a different scalability relation to its reference layers. In other words, an enhancement layer may be an enhancement of a first scalability type for its first reference layer and an enhancement of a second scalability type for its second reference layer. For example, an enhancement layer may be a spatial enhancement layer for a non-base view and it may have for example two reference layers, e.g. the spatial base layer for the same view and the spatial enhancement layer of the base view (having e.g. the same resolution as that of the enhancement layer of the non-base view). In another example, an enhancement layer may be a non-base depth view and it may have for example two reference layers, e.g. the texture view of the same viewpoint and the base depth view.

In some embodiments, an encoder may select to use a first type of inter-layer prediction from more than one reference layers of an enhancement layer, where the enhancement layer may have a different scalability relation to said more than one reference layers. For example, the encoder may apply sample prediction (e.g. similar to inter prediction by including an inter-layer reference picture into one or more reference picture lists) from a spatial base layer picture and from a view component of another view. Furthermore, the encoder may select to turn off a second type of inter-layer prediction from a subset of said more than one reference layers. For example, the encoder may apply motion information prediction from a spatial base layer picture but not from a view component of another view. The encoder may indicate in the bitstream which types of inter-layer prediction are available or may be applied between the enhancement layer and certain indicated one or more reference layers and/or may indicate in the bitstream which types of inter-layer prediction are not used between the enhancement layer and certain indicated one or more reference layers. The decoder may decode said indications from the bitstream and adapt its decoding operations in one or more ways described further below.

In the following, a component picture may be defined as a coded picture having certain scalability dimension or identifier values that differ from other component pictures of the same access unit or the same time instant. In other words, a component picture may be specified in such a manner that the value of at least scalability dimension identifier of a component picture differs from the value of the same scalability dimension identifier(s) of another component picture of the same time and/or in the same access unit. A component picture may be regarded as a collective term for a dependency representation, a layer representation, a texture view component, a depth view component, a depth map, or anything like. An access unit can consist of a relatively large number of component pictures, such as coded texture and depth view components as well as dependency and layer representations. A decoded component picture may be defined to be the decoded representation of a component picture. In single-loop decoding, only the component picture at the target layer or the highest layer present in the bitstream may be decoded. In multi-loop decoding, a component picture per each layer may be decoded and output from the decoder. For example, a decoded texture view component may be a decoded component picture.

Figure 8:
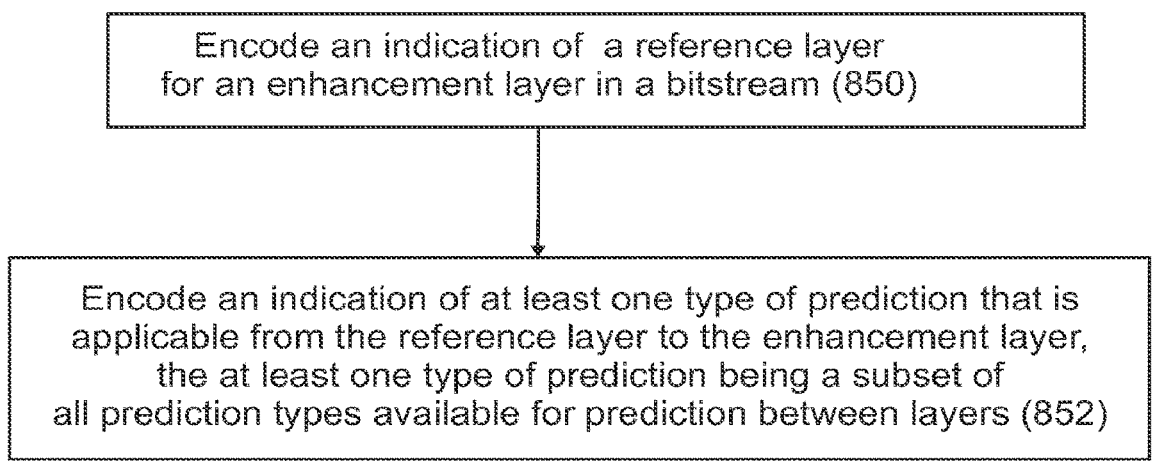
FIG. 8 shows a flow chart of an encoding process according to an embodiment of the invention.

According to an aspect, the need is addressed by a method shown in FIG. 8, wherein an encoder indicates in a bitstream a reference layer for an enhancement layer (850). The indication may be included, for example, in a video parameter set. In addition, the encoder may be arranged to indicate in the bitstream at least one type of prediction that may be applied from the reference layer to the enhancement layer, wherein the at least one type of prediction is a subset of all prediction types available for prediction between layers (852). Alternatively, or in addition to the indication of the at least one type of prediction that is or may be applied, the encoder may be arranged to indicate which types of prediction are not applied from the reference layer to the enhancement layer.

Thus, the encoder may adapt the encoding process to use only the indicated types of prediction from the reference layer to the enhancement layer.

According to an embodiment, a flag may be associated for a combination of a reference layer and an enhancement layer and used to indicate whether a particular prediction type may be used for prediction from the reference layer to the enhancement layer or whether that particular prediction type is not used for prediction from the reference layer to the enhancement layer. For example, one or more flags, each for different prediction type, may be included for each indicated reference layer for each enhancement layer in a video parameter set.

When example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table 2:

TABLE 2

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table 3:

TABLE 3

| codeNum | syntax element value |
|---------|----------------------|
| 0 | 0 |
| 1 | 1 |
| 2 | −1 |
| 3 | 2 |
| 4 | −2 |
| 5 | 3 |
| 6 | −3 |
| ... | ... |

When describing example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do ... while" structure specifies evaluation of a statement once, followed by a test of whether a condition is true, and if true, specifies repeated evaluation of the statement until the condition is no longer true. An "if ... else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

The draft Video Parameter Set Extension syntax for HEVC, JCTVC-K1007, enables flexible signaling of the scalability characteristics of a certain layer (e.g. depth_flag and/or view_id and/or dependency_id) and the layers a certain layer depends on. It does not specify which types of prediction take place from the reference layers. According to an embodiment, when applied to HEVC coding, the indications may be included in a video parameter set disclosed in JCTVC-K1007. In the following, an example of the video parameter set with new syntax elements for said indications is shown in Table 4.

TABLE 4

| vps extension( ) { | Descriptor |
|---|---|
|   while( !byte aligned( ) ) | |
|     vps_extension_byte_alignment_reserved_one_bit | u(1) |
|   avc_base_codec_flag | u(1) |
|   scalability_mask | u(16) |
|   *prediction_type_mask_len* | *u(4)* |
|   for( i = 0; i <NumScalabilityTypes; i++ ) { | |
|     dimension_id_len_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     for( j = 0; j < NumScalabilityTypes; j++ ) | |
|       dimension_id[ i ][ j ] | u(v) |
|   } | |
|   for( i = 1; i <= vps_max_layers_minus1; i++ ) { | |
|     // layer dependency | |
|     num_direct_ref_layers[ i ] | u(6) |
|     for( j = 0; j < num_direct_ref_layers[ i ]; j++ ) { | |
|       ref_layer_id[ i ][ j ] | u(6) |
|       *prediction_type_mask[ i ][ j ]* | *u(v)* |
|     } | |
|   } | |
| } | |

The new syntax elements, prediction_type_mask_len and prediction_type_mask[i][j], are shown in Table 4 in italics. The semantics of said syntax elements may be specified as follows:

prediction_type_mask_len specifies the number of bits in the prediction_type_mask[i][j] syntax element.
prediction_type_mask[i][j] specifies which types of dependencies or prediction are used from a component picture having layer_id equal to ref_layer_id[i][j] to the component picture having layer_id equal to layer_id_in_nuh[i].

The types of prediction and their bit number in prediction_type_mask[i][j] may be specified according to Table 5 below. Bit number 0 is the least significant bit in prediction_type_mask[i][j].

TABLE 5

| bit numberin prediction_type_mask[ i ][ j ] | type of prediction |
|---|---|
| 0 | sample prediction |
| 1 | motion information prediction |
| 2 | SAO parameter prediction |

TABLE 5-continued

| bit numberin prediction_type_mask[ i ][ j ] | type of prediction |
|---|---|
| 3 | intra mode information prediction |
| 4 . . . 15 | reserved |

When prediction_type_mask[i][j] is not present, it may be inferred to be equal to 4.

The variable SamplePredictionFlag[i][j] may be set equal to (prediction_type_mask[i][j] & 1).

The variable MotionInformationPredictionFlag[i][j] may be set equal to ((prediction_type_mask[i][j] & 2)>>1).

The variable SAOParameterPredictionFlag[i][j] may be set equal to ((prediction_type_mask[i][j] & 4)>>2).

The variable IntraModeInformationPredictionFlag[i][j] may be set equal to ((prediction_type_mask[i][j] & 8)>>3).

According to an embodiment, SAOParameterPredictionFlag[i][j] may be constrained to be equal to 1 at most once for values of j equal to 0 to num_direct_layers[i]−1, inclusive, for any particular value of i. In other words, some embodiments may constrain SAO parameter prediction so that prediction of SAO parameters is allowed from only one reference layer (or SAO parameters may be coded as in HEVC version 1).

A skilled person appreciates that the above-described syntax and semantics merely describe some non-limiting embodiments. It is to be understood that other embodiments, such as the ones described below, are possible.

According to an embodiment, the indication(s) may reside additionally or alternatively in another syntax structure, such as sequence parameter set, picture parameter set, any other type of a parameter set, sequence header, group of pictures header, picture header, slice header, and/or supplemental enhancement information message.

According to an embodiment, additionally or alternatively to the types of prediction in the above-described syntax and semantics, the procedure may be applied to other types of prediction.

According to an embodiment, the indication(s) need not be flags but may be of some other type, such as unsigned integer Exp-Golomb-coded syntax elements; i.e. ue(v). The indication(s) may, for example, associate the use of (or the possibility to use) several types of prediction into one value of a syntax element.

According to an embodiment, an indication for a certain prediction type may be followed (in the syntax) by a list of pairs of reference and enhancement layers between which the prediction type may be or is used. Alternatively or in addition, an indication of a certain prediction type may be followed (in the syntax) by a list of pairs of reference and enhancement layers between which the prediction type is not used.

According to an embodiment, the indication(s) may be separately provided for different picture types, such as one set of indication(s) for RAP pictures (Random Access Picture) and another set of indication(s) for non-RAP pictures. Alternatively or in addition, the indication(s) may be separately provided for different types of scalability, different sets of scalability layers, and/or different sets of temporal sub-layers.

According to an embodiment, a reference layer may be of different coding format than that of an enhancement layer using the reference layer for prediction or similarly a reference layer may conform to a different coding standard than what the enhancement layer using the reference layer for prediction conforms to. For example, a bitstream or a file may have a base layer conforming to the H.264/AVC, whereas an enhancement layer of the bitstream or file may conform to a scalable extension of the HEVC standard. The encoder may select the indicated prediction types between such layers to include only those that the reference layer decoder or decoding process outputs. For example, the encoder may choose the indicated prediction types to include only sample prediction or, in some cases, only sample prediction and motion information prediction.

Figure 9:
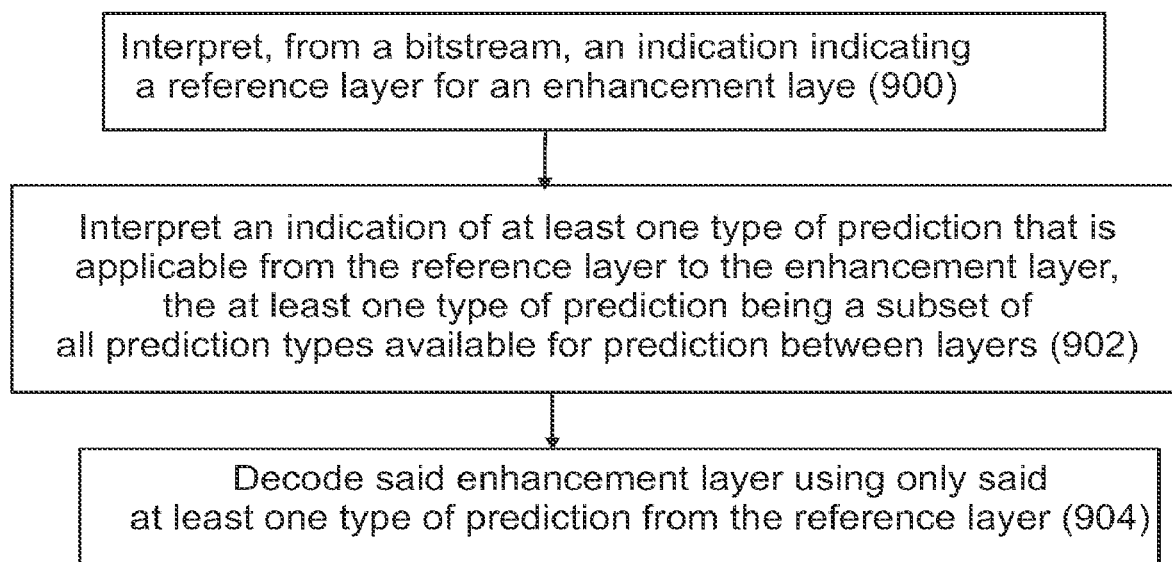
FIG. 9 shows a flow chart of a decoding process according to an embodiment of the invention.

Another aspect is the operation of the decoder, when it receives the bitstream encoded as described above. The decoding operations of the embodiments are opposite to the encoding operations, and they are depicted in FIG. 9. The decoder interprets from a bitstream a reference layer for an enhancement layer (900) and interprets from the bitstream at least one type of prediction applied from the reference layer to the enhancement layer, wherein the at least one type of prediction is a subset of all prediction types available for prediction between layers (902). Then the decoder decodes said enhancement layer using only said at least one type of prediction from the reference layer (904).

Thus, the decoder adapts the decoding process to use only the interpreted types of prediction from the reference layer to the enhancement layer.

Figure 10:
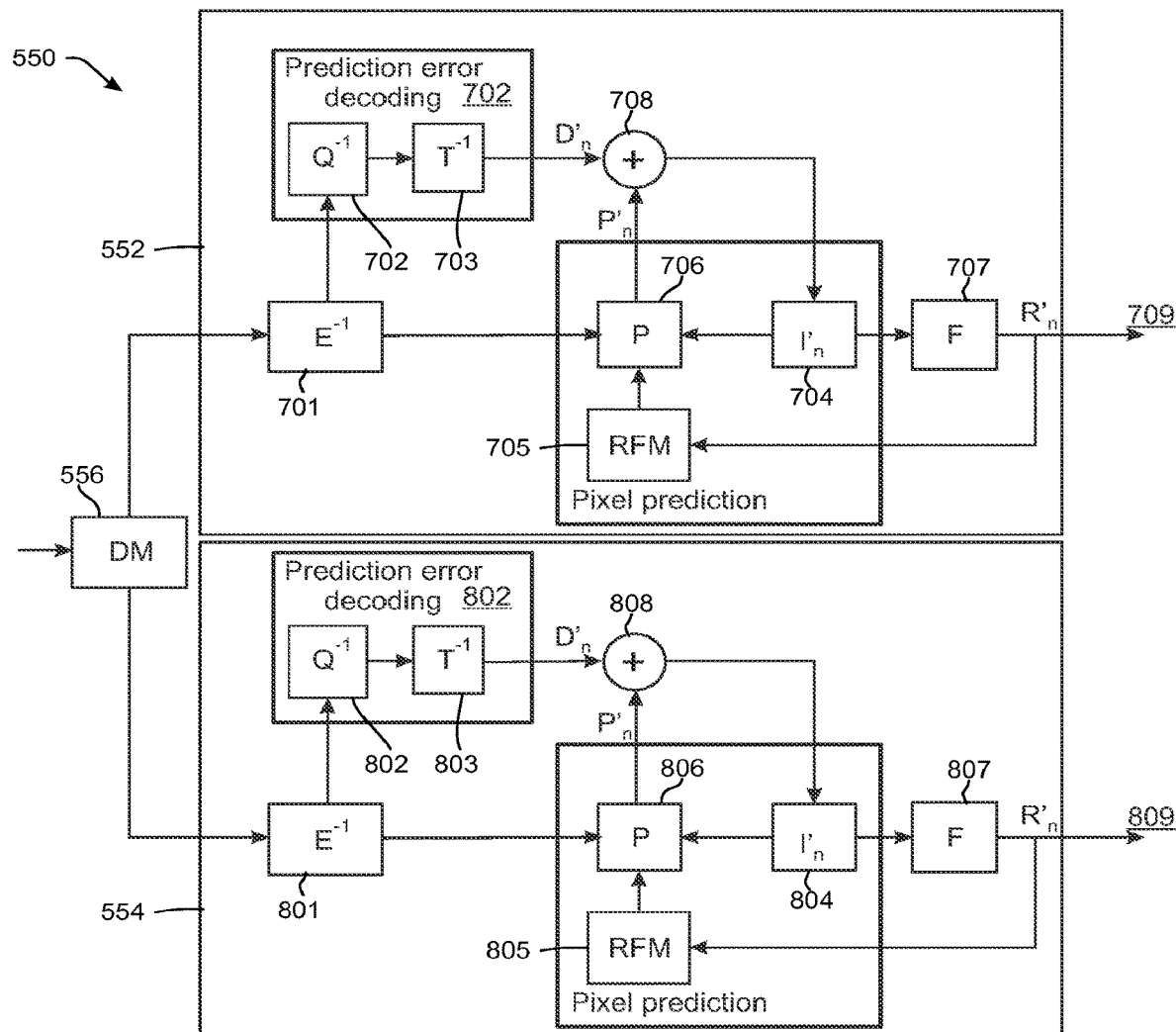
FIG. 10 shows a schematic diagram of a decoder according to some embodiments of the invention.

FIG. 10 shows a block diagram of a video decoder suitable for employing embodiments of the invention. The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

According to an embodiment, the indicated types of prediction may cause changes in the encoding and/or decoding process. Some non-limiting embodiments are described below.

According to an embodiment, if there is no reference layer or view indicated for sample prediction, then conventional intra prediction (for non-scalable coding) may be used. If there is only one layer indicated for sample prediction, then it may be used as a source for IntraBL or similar sample-based prediction modes in some embodiments. If there is more than one layer indicated for sample prediction of an enhancement layer, the encoder and/or the decoder may for example perform in one or more of the following ways:

In some embodiments, parameters or parameter values which may be coded into and decoded from the bitstream may be used to determine which one of the indicated layers is used for sample prediction. The parameters or parameter values may be specific to a block, such as a coding unit or a prediction unit.

In some embodiments, one of the layers indicated for sample prediction is selected by the encoder and/or the decoder for a specific prediction mode, such as IntraBL or similar. The selection may be pre-determined, for example the first indicated layer may be selected, or it may be indicated by the encoder in the bitstream for example using a specific syntax element and coded as the value of the syntax element. In some embodiments, the remaining layers indicated as source for sample prediction may be inserted into one or more initial or final reference picture lists and/or one or more of the encoding and/or decoding operations for reference picture list construction as described below may be performed.

In some embodiments, all layers indicated as source for sample prediction may be inserted into one or more initial or final reference picture lists and/or one or more of the encoding and/or decoding operations for reference picture list construction as described below may be performed.

According to an embodiment, motion information may be predicted from another component picture if indicated by the encoder. For example, a reference index and a motion vector from another component picture e.g. on another layer may be included as a candidate in motion vector prediction such as in the merge candidate list and/or in the AMVP candidate list. A motion field may be defined to comprise the motion information of a component picture. If a reference component picture has a different spatial resolution than that of the current component picture or if the motion field of the reference component picture has a different spatial resolution than that of the current component picture, the motion field of the reference component picture may be resampled or mapped to be applicable for the current component picture.

According to an embodiment, a referenced component picture may be included in one or more reference picture list of the current component picture if sample prediction or motion information prediction or both of them are indicated. One or more of the encoding and/or decoding operations related to construction of a reference picture list with component pictures from multiple layers as described below may be performed. The encoder may select the coded parameter values in such a manner that component pictures meant only for motion information prediction are not used for sample prediction. Similarly, the encoder may select the coded parameter values in such a manner that component pictures meant only for sample prediction are not used for motion information prediction. For example, if a multiview-video-plus-depth bitstream is encoded, the encoder may indicate a texture view component to be a reference for motion information prediction for a depth view component but not for sample prediction.

According to an embodiment, sample prediction and/or motion information prediction in inter-view and/or inter-layer direction may be performed by including a reference picture from a different view and/or a different layer into one or more reference picture lists of the current view and/or layer. A referenced component picture may be included in one or more reference picture list of the current component picture if sample prediction and/or motion information prediction is indicated. The indicated types of prediction may cause for example one or more of the following impacts in the encoding and/or decoding process:

Reference pictures for sample prediction and/or motion information prediction e.g. in inter-view and/or inter-layer prediction direction may be categorized in one or more reference picture sets. For example, reference pictures for inter-view prediction may be categorized into a reference picture set for inter-view prediction and a variable called e.g. InterViewLtCurr, be assigned to comprise a list of view_id, view order index, or layer_id values, for example, indicating the inter-view reference pictures.

A reference picture list may be initialized by including reference picture for motion-compensated temporal prediction e.g. according to HEVC reference picture list initialization process. In addition or alternatively, an initial reference picture list may be initialized to contain other reference pictures for sample prediction, such as those inter-view and/or inter-layer reference pictures used for sample prediction. According to an embodiment, pictures in particular reference picture sets, such as the reference picture set for inter-view prediction, e.g. denoted as InterViewLtCurr, may be appended or included into one or more reference picture lists.

An encoder may encode into a bitstream and/or a decoder may decode from a bitstream a reference picture list ordering or modification instruction. Reference picture list ordering or modification instructions may be constrained to concern only reference pictures that are inferred or indicated to be used for sample prediction and/or motion information prediction, while reference picture list instructions may omit or ignore other pictures. For example, a reference picture list ordering or modification instruction may include an index of reference pictures that from which a particular type of prediction may be applied to the current picture. For example, only component pictures that are indicated to be references for sample prediction and/or motion information prediction may be indexed where the index is for example starting from 0 for the first indicated reference picture for sample prediction and/or motion information prediction and incremented by 1 for each subsequent indicated reference picture for sample prediction and/or motion information prediction, respectively.

According to an embodiment, a mapping table or a mapping process is used for each reference picture list. Then, a reference index of motion vector prediction from another layer can be derived using the mapping table or mapping process, instead of copying the reference index of motion vector in another layer. Herein, the mapping table or the mapping process for reference picture lists may be similar to that described in the U.S. provisional patent application 61/706,727, filed on 27 Sep. 2012, incorporated by reference.

According to an embodiment, a partitioning, such as partitioning of a CTU to CUs, may be copied or predicted from another component picture, as indicated by the encoder. If partitioning is predicted, it may be further refined by indicating which partitions are further split and/or which partitions are merged. Indications on such further refinements may be encoded into the bitstream and decoded from the bitstream.

According to an embodiment, filtering parameters, such as SAO parameters, may be copied or predicted from another component picture, as indicated by the encoder.

According to an embodiment, limits may be imposed on the prediction type mask, for example, to ensure bitstream conformance. Such limits may be pre-defined, for example, in a coding standard and/or may be specific to a coding profile of a coding standard or system and/or a level of a coding standard or system. Alternatively or additionally, the encoder may encode one or more indications of such limits being applied. These one or more indications may reside, for example, in one or more sequence-level syntax structures, such as a sequence parameter set and/or a video parameter set. Alternatively or in addition, these one or more indications may reside, for example, in one or more bitstream-level syntax structures, such as a video parameter set that is applied for the entire bitstream.

Said syntax structures may reside in-band in the video bitstream and/or may be delivered as such and/or converted to another representation format (e.g. base-64 representation of the syntax structure or a list of ASCII-coded key-value pairs) out-of-band, for example using a signaling protocol such as the Session Description Protocol (SDP). Alternatively or in addition, said syntax structures or alike may be used in announcing the properties of a bitstream, for example using the Real-time Streaming Protocol (RTSP) or the Media Presentation Description (MPD) or a manifest file for adaptive streaming for example over HTTP. Alternatively or in addition, said syntax structures or alike may be used in session or mode negotiation, for example according to the SDP Offer/Answer model.

For the case of multiple spatial/quality layers, sample prediction could be used between those layers, and consequently multiple motion compensation loops would be needed to reconstruct the samples for each layer, which is very complex. According to an embodiment, to limit the complexity, syntax prediction could be used between layers, but reconstructed samples of a single layer can be used for predicting other layers. It may be, for example, specified that any operation point according to a particular coding profile must not require more than three motion compensation loops but the number of syntax prediction references is not limited. In other words, the requirement may be formulated as a constraint that the number of output layers summed up with the number of reference layers for sample prediction for those output layers must be less than or equal to 3, where the reference layers in the summation exclude those that are also output layers and include in a recursive manner all the reference layers (for sample prediction) of the reference layers.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises a method for encoding a bitstream comprising a base layer, a first enhancement layer and a second enhancement layer, the method further comprising encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to an embodiment, instead or in addition to the indication of the first or the second set of prediction types that is applicable from the base or the first enhancement layer to the second enhancement layer, encoding, in the bitstream, an indication of at least one set of prediction types that is not applicable from the base or the first enhancement 1 layer to the second enhancement layer.

According to an embodiment, the second enhancement layer enhances of a first scalability type relative to the base layer and a second scalability type relative to the first enhancement layer.

According to an embodiment, the method further comprises associating an indication for each of one or more combinations of the base and/or the first enhancement layer and the second enhancement layer; and encoding one or more of said indications in the bitstream to indicate whether a particular set of prediction types is applicable for prediction from the base and/or the first enhancement layer to the second enhancement layer or whether that particular set of prediction types is not applicable for prediction from the base and/or the first enhancement layer to the second enhancement layer.

According to an embodiment, the method further comprises encoding said indication in at least one of the following syntax structures: a video parameter set, a sequence parameter set, a picture parameter set, any other type of a parameter set, a sequence header, a group of pictures header, a picture header, a slice header, and/or a supplemental enhancement information message.

According to an embodiment, said prediction types include at least one of the following: sample prediction, motion information prediction, filtering parameter prediction.

According to an embodiment, the method further comprises associating an indication to indicate the applicability of several types of prediction into one value of a syntax element.

According to an embodiment, the method further comprises: encoding, in the syntax structure, an indication for a certain prediction type; and encoding, in the syntax structure, a list of pairs of reference and enhancement layers between which the prediction type is applicable.

According to an embodiment, encoding one or more indications for a first type of pictures, such as for RAP pictures, and encoding one or more indications for a second type of pictures, such as for non-RAP pictures.

According to an embodiment, encoding indications separately for different types of scalability, different sets of scalability layers, and/or different sets of temporal sub-layers.

An apparatus according to a second embodiment comprises: a video encoder configured for encoding a bitstream comprising a base layer, a first enhancement layer and a second enhancement layer, wherein said video encoder is further configured for encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a third embodiment there is provided a computer readable storage medium stored with code thereon for use by an apparatus, which when executed by a processor, causes the apparatus to perform: encoding an indication of both a base layer and a first enhancement layer used for prediction a the second enhancement layer in a bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a fourth embodiment there is provided at least one processor and at least one memory, said at least one memory stored with code thereon, which when executed by said at least one processor, causes an apparatus to perform: encoding an indication of both a base layer and a first enhancement layer used for prediction for a second enhancement layer in a bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

A method according to a fifth embodiment comprises a method for decoding a bitstream comprising a base layer, a first enhancement layer and a second enhancement layer, the method comprising interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to an embodiment, instead or in addition to the indication of the first or the second set of prediction types that is applicable from the base or the first enhancement layer to the second enhancement layer, the method further comprises decoding, from the bitstream, an indication of at least one set of prediction types that is not applicable from the base or the first enhancement layer to the second enhancement layer.

According to an embodiment, the second enhancement layer enhances of a first scalability type relative to the base layer and a second scalability type relative to the first enhancement layer.

According to an embodiment, the bitstream comprises an indication associated for each of one or more combinations of the base and/or the first enhancement layer and the second enhancement layer; and the method further comprises decoding one or more of said indications from the bitstream to interpret whether a particular set of prediction types is applicable for prediction from the base and/or the first enhancement layer to the second enhancement layer or whether that particular prediction type is not applicable for prediction from the base and/or the first enhancement layer to the second enhancement layer.

According to an embodiment, the method further comprises decoding said indication from at least one of the following syntax structures: a video parameter set, a sequence parameter set, a picture parameter set, any other type of a parameter set, a sequence header, a group of pictures header, a picture header, a slice header, and/or a supplemental enhancement information message.

According to an embodiment, said prediction types include at least one of the following: sample prediction, motion information prediction, filtering parameter prediction.

According to an embodiment, the method further comprises interpreting an indication indicating the applicability of several types of prediction into one value of a syntax element.

According to an embodiment, the method further comprises: decoding, from the syntax structure, an indication for a certain prediction type; and decoding, from the syntax structure, a list of pairs of reference and enhancement layers between which the prediction type is applicable.

According to an embodiment, decoding one or more indications for a first type of pictures, such as for RAP pictures, and decoding one or more indications for a second type of pictures, such as for non-RAP pictures.

According to an embodiment, decoding indications separately for different types of scalability, different sets of scalability layers, and/or different sets of temporal sublayers.

An apparatus according to a sixth embodiment comprises: a video decoder configured for decoding a bitstream comprising a base layer, a first enhancement layer and a second enhancement layer, the video decoder being configured for interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to a seventh embodiment there is provided a computer readable storage medium stored with code thereon for use by an apparatus, which when executed by a processor, causes the apparatus to perform: interpreting, from a bitstream, an indication indicating both a base layer and a first enhancement layer used for prediction for a second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to an eighth embodiment there is provided at least one processor and at least one memory, said at least one memory stored with code thereon, which when executed by said at least one processor, causes an apparatus to perform: interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

According to a ninth embodiment there is provided a video encoder configured for encoding a bitstream comprising a base layer, a first enhancement layer and a second one enhancement layer, wherein said video encoder is further configured for: encoding an indication of both the base layer and the first enhancement layer used for prediction for the second enhancement layer in the bitstream; encoding, in the bitstream, an indication of a first set of prediction types that is applicable from the base layer to the second enhancement layer, wherein the first set of prediction types is a subset of all prediction types available for prediction between layers, and encoding, in the bitstream, an indication of a second set of prediction types that is applicable from the first enhancement layer to the second enhancement layer, wherein the second set of prediction types is a subset of all prediction types available for prediction between layers.

According to a tenth embodiment there is provided a video decoder configured for encoding a bitstream comprising a base layer, a first enhancement layer and a second enhancement layer, wherein said video decoder is further configured for: interpreting, from the bitstream, an indication indicating both the base layer and the first enhancement layer used for prediction for the second enhancement layer; interpreting, from the bitstream, an indication of a first set of prediction types that is applicable from the base layer to the second enhancement layer, wherein the first set of prediction types is a subset of all prediction types available for prediction between layers; interpreting, from the bitstream, an indication of a second set of prediction types that is applicable from the first enhancement layer to the second enhancement layer, wherein the second set of prediction types is a subset of all prediction types available for prediction between layers; and decoding said second enhancement layer using only said first set of prediction types from the base layer and said second set of prediction types from the first enhancement layer.

That which is claimed is:

1. A method comprising:
   encoding a bitstream comprising a base layer, a first enhancement layer and a second enhancement layer;
   encoding, in the bitstream, an indication of a number of bits in a prediction type mask syntax element;
   encoding, in the bitstream using a first prediction type mask syntax, an indication of a first set of prediction types that is applicable from the base layer to the second enhancement layer, wherein the first set of prediction types is a subset of all prediction types available for prediction between layers; and
   encoding, in the bitstream using a second prediction type mask syntax, an indication of a second set of prediction types that is applicable from the first enhancement layer to the second enhancement layer, wherein the second set of prediction types is a subset of all prediction types available for prediction between layers,
   wherein each of said prediction types available for prediction between layers is represented in the first prediction type mask syntax and the second prediction type mask syntax, and
   wherein said prediction types available for prediction between layers are adaptively selectable as at least one of the following: sample prediction, motion information prediction or filtering parameter prediction.

2. The method according to claim 1, further comprising:
   encoding a picture of the base layer and a picture of the first enhancement layer; and
   encoding a picture of said second enhancement layer using said first set of prediction types from the picture of the base layer and said second set of prediction types from the picture of the first enhancement layer.

3. The method according to claim 1,
   wherein each of said prediction types available for prediction between layers is represented by a bit number in the first prediction type mask syntax and the second prediction type mask syntax.

4. The method according to claim 1, wherein said indication of the first set of prediction types and said indication of the second set of prediction types are included in at least one of a sequence parameter set or a video parameter set.

5. The method according to claim 1, further comprising encoding, in the bitstream, an indication of at least one set of prediction types that is not applicable from the base layer or the first enhancement layer to the second enhancement layer.

6. The method according to claim 1, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

7. The method according to claim 6, wherein the prediction types available for prediction between the second enhancement layer and the base layer are dependent on the first scalability type, and wherein the prediction types available for prediction between the second enhancement layer and the first enhancement layer are dependent on the second scalability type.

8. The method according to claim 1, wherein the first set of prediction types has a first prediction direction and the second set of prediction types has a second prediction direction, and wherein said first prediction direction and second prediction direction are one of the following: temporal prediction, inter-view prediction, inter-layer prediction or inter-component prediction.

9. An apparatus comprising:
   at least one processor and at least one memory, said at least one memory stored with code thereon, which when executed by said at least one processor, causes the apparatus to perform:
   encoding a bitstream comprising a base layer, a first enhancement layer and a second enhancement layer;

encoding, in the bitstream, an indication of a number of bits in a prediction type mask syntax element;

encoding, in the bitstream using a first prediction type mask syntax, an indication of a first set of prediction types that is applicable from the base layer to the second enhancement layer, wherein the first set of prediction types is a subset of all prediction types available for prediction between layers; and encoding, in the bitstream using a second prediction type mask syntax, an indication of a second set of prediction types that is applicable from the first enhancement layer to the second enhancement layer, wherein the second set of prediction types is a subset of all prediction types available for prediction between layers, wherein each of said prediction types available for prediction between layers is represented in the first prediction type mask syntax and the second prediction type mask syntax, and wherein said prediction types available for prediction between layers are adaptively selectable as at least one of the following: sample prediction, motion information prediction or filtering parameter prediction.

10. The apparatus according to claim 9, wherein the apparatus is also caused to:

encode a picture of the base layer and a picture of the first enhancement layer; and encode a picture of said second enhancement layer using said first set of prediction types from the picture of the base layer and said second set of prediction types from the picture of the first enhancement layer.

11. The apparatus according to claim 9,
wherein each of said prediction types available for prediction between layers is represented by a bit number in the first prediction type mask syntax and the second prediction type mask syntax.

12. The apparatus according to claim 9, wherein said indication of the first set of prediction types and said indication of the second set of prediction types are included in at least one of a sequence parameter set or a video parameter set.

13. The apparatus according to claim 9, wherein the apparatus is further configured to encode, in the bitstream, an indication of at least one set of prediction types that is not applicable from the base layer or the first enhancement layer to the second enhancement layer.

14. The apparatus according to claim 9, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

15. The apparatus according to claim 14 wherein the prediction types available for prediction between the second enhancement layer and the base layer are dependent on the first scalability type, and wherein the prediction types available for prediction between the second enhancement layer and the first enhancement layer are dependent on the second scalability type.

16. The apparatus according to claim 9, wherein the first set of prediction types has a first prediction direction and the second set of prediction types has a second prediction direction, and wherein said first prediction direction and second prediction direction are one of the following: temporal prediction, inter-view prediction, inter-layer prediction or inter-component prediction.

17. A non-transitory computer readable storage medium stored with code thereon for use by an apparatus, which when executed by a processor, causes the apparatus to perform:

encoding a bitstream comprising a base layer, a first enhancement layer and a second enhancement layer;

encoding, in the bitstream, an indication of a number of bits in a prediction type mask syntax element;

encoding, in the bitstream using a first prediction type mask syntax, an indication of a first set of prediction types that is applicable from the base layer to the second enhancement layer, wherein the first set of prediction types is a subset of all prediction types available for prediction between layers; and encoding, in the bitstream using a second prediction type mask syntax, an indication of a second set of prediction types that is applicable from the first enhancement layer to the second enhancement layer, wherein the second set of prediction types is a subset of all prediction types available for prediction between layers, wherein each of said prediction types available for prediction between layers is represented in the first prediction type mask syntax and the second prediction type mask syntax, and wherein said prediction types available for prediction between layers are adaptively selectable as at least one of the following: sample prediction, motion information prediction or filtering parameter prediction.

18. The computer readable storage medium according to claim 17, wherein the code, when executed by the processor, also causes the apparatus to:

encode a picture of the base layer and a picture of the first enhancement layer; and encode a picture of said second enhancement layer using said first set of prediction types from the picture of the base layer and said second set of prediction types from the picture of the first enhancement layer.

19. The computer readable storage medium according to claim 17,
wherein each of said prediction types available for prediction between layers is represented by a bit number in the first prediction type mask syntax and the second prediction type mask syntax.

20. The computer readable storage medium according to claim 17, wherein said indication of the first set of prediction types and said indication of the second set of prediction types are included in at least one of a sequence parameter set or a video parameter set.

21. The computer readable storage medium according to claim 17, wherein the code, when executed by the processor, also causes the apparatus to encode, in the bitstream, an indication of at least one set of prediction types that is not applicable from the base layer or the first enhancement layer to the second enhancement layer.

22. The computer readable storage medium according to claim 17, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

23. The computer readable storage medium according to claim 22, wherein the prediction types available for prediction between the second enhancement layer and the base layer are dependent on the first scalability type, and wherein the prediction types available for prediction between the second enhancement layer and the first enhancement layer are dependent on the second scalability type.

24. A method comprising:
decoding, from a bitstream, an indication of a number of bits in a prediction type mask syntax element;
decoding, from a first prediction type mask syntax in the bitstream, an indication of a first set of prediction types that is applicable from a base layer to a second enhancement layer, wherein the first set of prediction types is a subset of all prediction types available for prediction between layers;
decoding, from a second prediction type mask syntax in the bitstream, an indication of a second set of prediction types that is applicable from a first enhancement layer to the second enhancement layer, wherein the second set of prediction types is a subset of all prediction types available for prediction between layers;
decoding a picture of the base layer and a picture of the first enhancement layer; and
decoding a picture of said second enhancement layer using said first set of prediction types from the picture of the base layer and said second set of prediction types from the picture of the first enhancement layer,
wherein each of said prediction types available for prediction between layers is represented in the first prediction type mask syntax and the second prediction type mask syntax, and
wherein said prediction types available for prediction between layers are at least one of the following: sample prediction, motion information prediction or filtering parameter prediction.

25. The method according to claim 24,
wherein each of said prediction types available for prediction between layers is represented by a bit number in the first prediction type mask syntax and the second prediction type mask syntax.

26. The method according to claim 24, wherein said indication of the first set of prediction types and said indication of the second set of prediction types are decoded from at least one of a sequence parameter set or a video parameter set.

27. The method according to claim 24, further comprising decoding, from the bitstream, an indication of at least one set of prediction types that is not applicable form the base layer or the first enhancement layer to the second enhancement layer.

28. The method according to claim 24, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

29. The method according to claim 28, wherein the prediction types available for prediction between the second enhancement layer and the base layer are dependent on the first scalability type, and wherein the prediction types available for prediction between the second enhancement layer and the first enhancement layer are dependent on the second scalability type.

30. The method according to claim 24, wherein the first set of prediction types has a first prediction direction and the second set of prediction types has a second prediction direction, and wherein said first prediction direction and second prediction direction are one of the following: temporal prediction, inter-view prediction, inter-layer prediction or inter-component prediction.

31. An apparatus comprising:
at least one processor and at least one memory, said at least one memory stored with code thereon, which when executed by said at least one processor, causes the apparatus to perform:
decoding, from a bitstream, an indication of a number of bits in a prediction type mask syntax element;
decoding, from a first prediction type mask syntax in the bitstream, an indication of a first set of prediction types that is applicable from a base layer to a second enhancement layer, wherein the first set of prediction types is a subset of all prediction types available for prediction between layers;
decoding, from a second prediction type mask syntax in the bitstream, an indication of a second set of prediction types that is applicable from a first enhancement layer to the second enhancement layer, wherein the second set of prediction types is a subset of all prediction types available for prediction between layers;
decoding a picture of the base layer and a picture of the first enhancement layer; and
decoding a picture of said second enhancement layer using said first set of prediction types from the picture of the base layer and said second set of prediction types from the picture of the first enhancement layer,
wherein each of said prediction types available for prediction between layers is represented in the first prediction type mask syntax and the second prediction type mask syntax, and
wherein said prediction types available for prediction between layers are at least one of the following: sample prediction, motion information prediction or filtering parameter prediction.

32. The apparatus according to claim 31,
wherein each of said prediction types available for prediction between layers is represented by a bit number in the first prediction type mask syntax and the second prediction type mask syntax.

33. The apparatus according to claim 31, wherein said indication of the first set of prediction types and said indication of the second set of prediction types are decoded from at least one of a sequence parameter set or a video parameter set.

34. The apparatus according to claim 31, wherein the apparatus is further caused to decode, from the bitstream, an indication of at least one set of prediction types that is not applicable form the base layer or the first enhancement layer to the second enhancement layer.

35. The apparatus according to claim 31, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

36. The apparatus according to claim 35, wherein the prediction types available for prediction between the second enhancement layer and the base layer are dependent on the first scalability type, and wherein the prediction types available for prediction between the second enhancement layer and the first enhancement layer are dependent on the second scalability type.

37. The apparatus according to claim 31, wherein the first set of prediction types has a first prediction direction and the second set of prediction types has a second prediction direction, and wherein said first prediction direction and second prediction direction are one of the following: temporal prediction, inter-view prediction, inter-layer prediction or inter-component prediction.

38. A non-transitory computer readable storage medium stored with code thereon for use by an apparatus, which when executed by a processor, causes the apparatus to perform:
- decoding, from a bitstream, an indication of a number of bits in a prediction type mask syntax element;
- decoding, from a first prediction type mask syntax in the bitstream, an indication of a first set of prediction types that is applicable from a base layer to a second enhancement layer, wherein the first set of prediction types is a subset of all prediction types available for prediction between layers;
- decoding, from a second prediction type mask syntax in the bitstream, an indication of a second set of prediction types that is applicable from a first enhancement layer to the second enhancement layer, wherein the second set of prediction types is a subset of all prediction types available for prediction between layers;
- decoding a picture of the base layer and a picture of the first enhancement layer; and
- decoding a picture of said second enhancement layer using said first set of prediction types from the picture of the base layer and said second set of prediction types from the picture of the first enhancement layer,
- wherein each of said prediction types available for prediction between layers is represented in the first prediction type mask syntax and the second prediction type mask syntax, and wherein said prediction types available for prediction between layers are at least one of the following: sample prediction, motion information prediction or filtering parameter prediction.

39. The computer readable storage medium according to claim 38,
wherein each of said prediction types available for prediction between layers is represented by a bit number in the first prediction type mask syntax and the second prediction type mask syntax.

40. The computer readable storage medium according to claim 38, wherein said indication of the first set of prediction types and said indication of the second set of prediction types are decoded from at least one of a sequence parameter set or a video parameter set.

41. The computer readable storage medium according to claim 38, wherein the code, when executed by the processor, also causes the apparatus to decode, from the bitstream, an indication of at least one set of prediction types that is not applicable form the base layer or the first enhancement layer to the second enhancement layer.

42. The computer readable storage medium according to claim 38, wherein the second enhancement layer enhances a first scalability type relative to the base layer and a second scalability type relative to the first enhancement layer, and wherein the first scalability type and second scalability type are selected from at least one of: temporal scalability, quality scalability, spatial scalability, view scalability, depth enhancements, bit-depth scalability, chroma format scalability or color gamut scalability.

43. The computer readable storage medium according to claim 42, wherein the prediction types available for prediction between the second enhancement layer and the base layer are dependent on the first scalability type, and wherein the prediction types available for prediction between the second enhancement layer and the first enhancement layer are dependent on the second scalability type.

* * * * *

UNITED STATES PATENT AND TRADEMARK OFFICE
CERTIFICATE OF CORRECTION

PATENT NO. : 11,800,131 B2
APPLICATION NO. : 17/504092
DATED : October 24, 2023
INVENTOR(S) : Miska Matias Hannuksela et al.

It is certified that error appears in the above-identified patent and that said Letters Patent is hereby corrected as shown below:

In the Drawings

In sheet 6 of 7, FIG. 9, reference numeral (900), Line 2, delete "laye" and insert -- layer --, therefor.

In the Claims

In Column 57, Line 47, Claim 27, delete "form the base" and insert -- from the base --, therefor.

In Column 58, Line 53, Claim 34, delete "form the base" and insert -- from the base --, therefor.

In Column 60, Line 20, Claim 41, delete "form the base" and insert -- from the base --, therefor.

Signed and Sealed this
Twelfth Day of March, 2024

*Katherine Kelly Vidal*

Katherine Kelly Vidal
*Director of the United States Patent and Trademark Office*